(12) United States Patent
El-Moussa et al.

(10) Patent No.: US 12,401,686 B2
(45) Date of Patent: Aug. 26, 2025

(54) DETECTING CHANGES TO WEB PAGE CHARACTERISTICS USING MACHINE LEARNING

(71) Applicant: BRITISH TELECOMMUNICATIONS PUBLIC LIMITED COMPANY, London (GB)

(72) Inventors: Fadi El-Moussa, London (GB); Xiaofeng Du, London (GB)

(73) Assignee: British Telecommunications Public Limited Company, London (GB)

( * ) Notice: Subject to any disclaimer, the term of this patent is extended or adjusted under 35 U.S.C. 154(b) by 125 days.

(21) Appl. No.: 16/636,282

(22) PCT Filed: Jul. 30, 2018

(86) PCT No.: PCT/EP2018/070632
§ 371 (c)(1),
(2) Date: Feb. 3, 2020

(87) PCT Pub. No.: WO2019/025386
PCT Pub. Date: Feb. 7, 2019

(65) Prior Publication Data
US 2020/0228569 A1    Jul. 16, 2020

(30) Foreign Application Priority Data
Aug. 2, 2017 (EP) .................................. 17184578

(51) Int. Cl.
*H04L 9/00* (2022.01)
*G06F 16/958* (2019.01)
(Continued)

(52) U.S. Cl.
CPC ........ *H04L 63/1483* (2013.01); *G06F 16/958* (2019.01); *G06N 3/045* (2023.01); *H04L 63/1416* (2013.01)

(58) Field of Classification Search
CPC .......................... H04L 63/1433; G06K 9/6256
(Continued)

(56) References Cited

U.S. PATENT DOCUMENTS

| 10,769,292 B2 | 9/2020 | Daniel |
| 10,951,651 B1 | 3/2021 | Golan et al. |

(Continued)

FOREIGN PATENT DOCUMENTS

| CN | 102411687 A | 4/2012 |
| CN | 106951783 A | 7/2017 |

(Continued)

OTHER PUBLICATIONS

Ahmad S., et al., "How do Neurons Operate on Sparse Distributed Representations? A Mathematical Theory of Sparsity, Neurons and Active Dendrites," Retrieved from https://arxiv.org/ftp/arxiv/papers/1601/1601.00720.pdf, 2018, 23 pages.

(Continued)

*Primary Examiner* — Christopher J Brown
(74) *Attorney, Agent, or Firm* — EIP US LLP (57) ABSTRACT

A computer implemented method to detect an anomalous change to a web application, the web application executing with a web server, the method including receiving a first set of records for the web application operating in a training mode of operation, each record including characteristics of a content of a web page for the web application; generating a sparse distributed representation of the set of records to form a training set for a hierarchical temporal memory (HTM); training the HTM based on the training set in order that the trained HTM provides a model of the operation of the web application in the training mode of operation; receiving a second set of records for the web application, each record including characteristics of content of the web page; generating a sparse distributed representation of the (Continued)

second set of records to form an input set for the trained HTM; executing the trained HTM based on the input set to determine a degree of recognition of the records of the input set; and responsive to a determination that a degree of recognition of one or more records of the input set is below a threshold degree, identifying an anomalous change to the web page.

4 Claims, 3 Drawing Sheets

(51) Int. Cl.
  *G06N 3/045* (2023.01)
  *H04L 9/40* (2022.01)
(58) Field of Classification Search
  USPC .......................................................... 726/25
  See application file for complete search history.

(56) References Cited

U.S. PATENT DOCUMENTS

| | | | |
|---|---|---|---|
| 11,050,768 B1* | 6/2021 | Stickle | H04L 63/1425 |
| 2009/0282480 A1* | 11/2009 | Lee | G06F 21/55 |
| | | | 717/130 |
| 2009/0313193 A1 | 12/2009 | Hawkins et al. | |
| 2012/0005753 A1 | 1/2012 | Provos et al. | |
| 2012/0047581 A1 | 2/2012 | Banerjee et al. | |
| 2013/0054496 A1 | 2/2013 | Marianetti, II et al. | |
| 2014/0067734 A1* | 3/2014 | Hawkins | G06N 7/01 |
| | | | 706/58 |
| 2015/0127595 A1* | 5/2015 | Hawkins, II | G06N 7/005 |
| | | | 706/46 |
| 2016/0028762 A1 | 1/2016 | Di Pietro et al. | |
| 2016/0321557 A1 | 11/2016 | Hawkins et al. | |
| 2017/0053025 A1* | 2/2017 | De Sousa Webber | |
| | | | G06F 16/358 |
| 2017/0068816 A1 | 3/2017 | Cavazos | |
| 2017/0104773 A1* | 4/2017 | Flacher | H04L 63/1458 |
| 2017/0116412 A1 | 4/2017 | Stopel et al. | |
| 2017/0116415 A1 | 4/2017 | Stopel et al. | |
| 2017/0126718 A1* | 5/2017 | Baradaran | H04L 63/0281 |
| 2018/0020024 A1* | 1/2018 | Chao | G06F 17/18 |
| 2018/0124080 A1* | 5/2018 | Christodorescu | G06F 21/552 |
| 2021/0089650 A1 | 3/2021 | Daniel | |
| 2021/0089670 A1 | 3/2021 | Daniel | |

FOREIGN PATENT DOCUMENTS

| | | |
|---|---|---|
| EP | 1814055 A2 | 8/2007 |
| WO | WO-2017194637 A1 | 11/2017 |

OTHER PUBLICATIONS

Ahmad S., et al., "Properties of Sparse Distributed Representations and their Application to Hierarchical Temporal Memory," retrieved from https://arxiv.org/ftp/arxiv/papers/1503/1503.07469.pdf on Mar. 28, 2018, Numenta, Mar. 24, 2015, 18 pages.
Ahmad S., et al., "Real-Time Anomaly Detection for Streaming Analytics," retrieved from https://arxiv.org/pdf/1607.02480.pdf on Mar. 28, 2018, Numenta, Inc., Jul. 8, 2016, 10 pages.
Antonopoulos A.M., "Mastering Bitcoin, Unlocking Digital Crypto-Currencies," O'Reilly Media, Apr. 2014, 282 pages.
Assia Y., et al., "Colored Coins Whitepaper," 2015, available at https://docs.google.com/document/d/1AnkP_cVZTCMLIzw4DvsW6M8Q2JC0llzrTLuoWu2z1BE/, 23 pages.
Berger V., "Anomaly Detection in User Behavior of Websites Using Hierarchical Temporal Memories," May 19, 2017, retrieved from URL http://kth.diva-portal.org/smash/get/diva2:1094877/FULLTEXT01.pdf on Sep. 5, 2017.
Billaudelle S., et al., "Porting HTM Models to the Heidelberg Neuromorphic Computing Platform," Feb. 9, 2016, Cornell University Library, retrieved from https://arxiv.org/pdf/1505.02142.pdf, 9 pages.
Communication pursuant to Article 94(3) EPC for European Application No. 18811033.2, mailed Jan. 14, 2022, 4 pages.
Cui Y., et al., "Continuous Online Sequence Learning with an Unsupervised Neural Network Model," Neural Computation, vol. 28, No. 11, Nov. 2016, pp. 2474-2504.
Cui Y., et al., "The HTM Spatial Pooler: A Neocortical Algorithm for Online Sparse Distributed Coding," retrieved from https://www.biorxiv.org/content/biorxiv/early/2017/02/16/085035.full.pdf on Mar. 28, 2018, Numenta Inc., Feb. 3, 2017, 16 pages.
Hawkins J., et al., "Hierarchical Temporal Memory Concepts, Theory, and Terminology," Numenta Inc., 2006, 19 pages.
Hawkins J., et al., "Why Neurons Have Thousands of Synapses, A Theory of Sequence Memory in Neocortex," Frontiers in Neural Circuits, vol. 10, Article 23, Mar. 2016, 13 pages.
Hawkins J, "On Intelligence," How a New Understanding of the Brain Will Lead to the Creation of Truly Intelligent Machines, 2004, Times Books, Jul. 14, 2005, 174 pages.
International Preliminary Report on Patentability for Application No. PCT/EP2018/070631, mailed on Feb. 13, 2020, 9 pages.
International Preliminary Report on Patentability for Application No. PCT/EP2018/070632, mailed on Feb. 13, 2020, 10 pages.
International Search Report and Written Opinion for Application No. PCT/EP2018/070631, mailed on Aug. 17, 2018, 12 pages.
International Search Report and Written Opinion for Application No. PCT/EP2018/070632, mailed on Aug. 21, 2018, 13 pages.
International Search Report and Written Opinion For PCT Application No. PCT/EP2018/083358, mailed on Feb. 15, 2019, 11 pages.
Lavin A., et al., "Evaluating Real-Time Anomaly Detection Algorithms—The Numenta Anomaly Benchmark," Retrieved from https://arxiv.org/ftp/arxiv/papers/1510/1510.03336.pdf, Numenta, Inc., Oct. 9, 2015, 8 pages.
Network Working Group, "Hypertext Transfer Protocol—HTTP/1.1," Jun. 1999, 114 Pages.
Numenta, "Biological and Machine Intelligence (BAMI), A living book that documents Hierarchical Temporal Memory (HTM)," Mar. 8, 2017, 69 pages.
Numenta, "Hierarchical Temporal Memory including HTM Cortical Learning Algorithms," Version 0.2.1, Numenta, Sep. 12, 2011, 68 pages.
Numenta, "The Science of Anomaly Detection," How HTM Enables Anomaly Detection in Streaming Data, Dec. 31, 2015, Retrieved from URL:https://numenta.com/assets/pdf/whitepapers/Numenta%20White%20Paper%20-%20Science%20of%20Anomaly%20Detection.pdf retrieved on Sep. 7, 2017.
Office Action For GB Application No. 17184578.7, mailed on Sep. 18, 2017, 11 pages.
Office Action For GB Application No. 17184580.3, mailed on Nov. 3, 2017, 8 pages.
Office Action For GB Application No. 1720174.0, mailed on May 23, 2018, 6 pages.
Olshausen B.A., et al., "Sparse Coding with an Overcomplete Basis Set: A Strategy Employed by VI?," Pergamon, vol. 37, No. 23, 1997, pp. 3311-3325.
Purdy S., "Encoding Data for HTM Systems," Retrieved from https://arxiv.org/ftp/arxiv/papers/1602/1602.05925.pdf, Numenta, Inc., Feb. 2016, 11 pages.
Rosenfeld M., "Overview of Colored Coins," https://bravenewcoin.com/assets/Whitepapers/Overview-of-Colored-Coins.pdf, Dec. 4, 2012, 13 pages.
Taylor M., "Sparse Distributed Representations," Numenta, 2017, 3 pages.
Thorpe S.J., "Spike Arrival Times: A Highly Efficient Coding Scheme for Neural Networks," Parallel Processing in Neural Systems and Computers, 1990, pp. 91-94.
Wang, C. et al.; "A Distributed Anomaly Detection System for In-Vehicle Network Using HTM," 2018, vol. 6, pp. 9091-9098.
Wood G., "Ethereum: A Secure Decentralised Generalized Transaction Ledger," EIP-150 Revision, Jun. 4, 2014, pp. 1-32.
Application and File History for U.S. Appl. No. 16/636,280, filed Feb. 3, 2020, Inventors: El Moussa et al.

(56) References Cited

OTHER PUBLICATIONS

Application and File History for U.S. Appl. No. 15/733,180, filed Jun. 4, 2020, Inventors: El Moussa et al.

* cited by examiner

DETECTING CHANGES TO WEB PAGE CHARACTERISTICS USING MACHINE LEARNING

PRIORITY CLAIM

The present application is a National Phase entry of PCT Application No. PCT/EP2018/070632, filed Jul. 30, 2018, which claims priority from EP Patent Application No. 17184578.7, filed Aug. 2, 2017, which is hereby fully incorporated herein by reference.

TECHNICAL FIELD

The present disclosure relates to the detection of changes to web page characteristics of web applications.

BACKGROUND

Malicious attacks to network connected computer systems present a serious and growing concern for the security of the systems, data stored and/or communicated by such systems and other computing entities operating in communication with such systems. For example, a server component such as a web server can be compromised, such as by exploitation of a software or network vulnerability. Information, configuration and communications involving such compromised components are then at risk of potential disclosure to malicious entities. Additionally or alternatively, such a compromised system can be used to communicate with other malicious entities including other network connected components that are vulnerable to exploitation, such as client computer systems. Such attacks can include, for example, cross site scripting (XSS) and malware infection of a web server.

SUMMARY

Preventing such malicious attacks requires first the detection of such attacks and it would be desirable to provide techniques for detecting malicious attacks in order that malicious entities can be constrained in their effort to spread malicious software throughout a network.

The present disclosure accordingly provides, in a first aspect, a computer implemented method to detect an anomalous change to a web application, the web application executing with a web server, the method comprising: receiving a first set of records for the web application operating in a training mode of operation, each record including characteristics of a content of a web page for the web application; generating a sparse distributed representation of the set of records to form a training set for a hierarchical temporal memory (HTM); training the HTM based on the training set in order that the trained HTM provides a model of the operation of the web application in the training mode of operation; receiving a second set of records for the web application, each record including characteristics of content of the web page; generating a sparse distributed representation of the second set of records to form an input set for the trained HTM; executing the trained HTM based on the input set to determine a degree of recognition of the records of the input set; and responsive to a determination that a degree of recognition of one or more records of the input set is below a threshold degree, identifying an anomalous change to the web page.

In some embodiments, in response to the identification of the anomalous change to the web page, implementing a responsive measure to the anomalous change.

In some embodiments, the responsive measure includes one or more of: interrupting operation of the web application; identifying client components in communication with the web application as potentially compromised; executing an intrusion detection, malware detection, virus removal and/or malware removal process for the web application; and effecting a redeployment, reinstallation and/or reconfiguration of the web application.

In some embodiments, in the training mode of operation, the HTM evaluates an anomaly score for records in the first set of records and the HTM is trained until the anomaly score meets a predetermined threshold degree of anomaly.

In some embodiments, the characteristics of the web page include records corresponding to hypertext markup language (HTML) tags in the web page.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE FIGURES

Embodiments of the present disclosure will now be described, by way of example only, with reference to the accompanying drawings, in which.

DETAILED DESCRIPTION OF EMBODIMENTS

Figure 1:
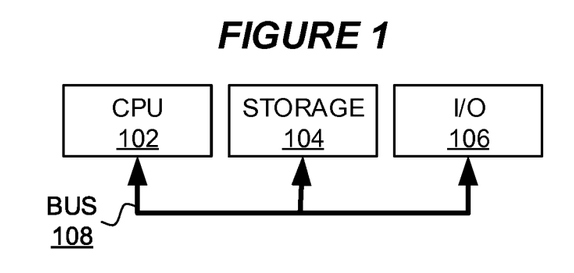
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious attacks on web servers frequently lead to a change to configuration of a web server that can exhibit as changes to characteristics of a web application including subtle changes. Such changes can include, inter alia, changes to HTTP headers, HTTP response messages, traffic management changes, connection closure mechanics and changes to characteristics of web pages themselves. Embodiments of the present invention seek to detect anomalous changes to a web application configuration or changes to a web application itself being indicative of malicious intervention.

Figure 2:
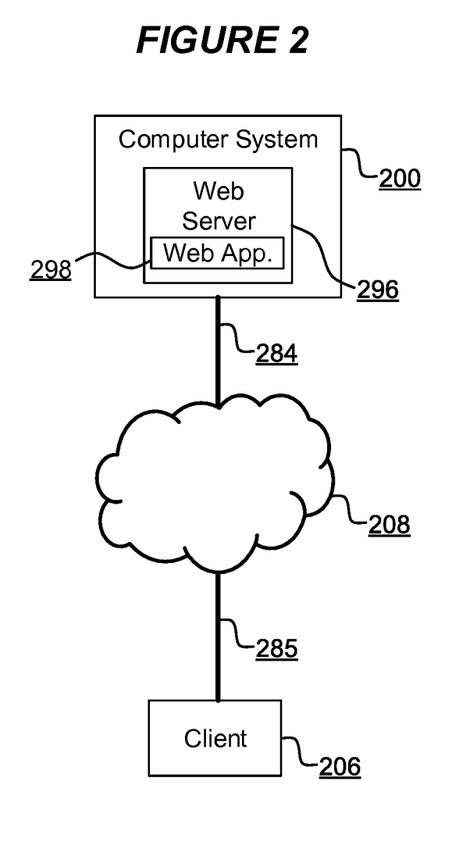
FIG. 2 is an illustration of an exemplary arrangement of a computer system configured to execute a web application according to embodiments of the present disclosure.

FIG. 2 is an illustration of an exemplary arrangement of a computer system 200 configured to execute a web application 298 according to embodiments of the present disclosure. The computer system 200 can be a physical, virtual or combination computer system communicatively connected with one or more clients 206. The clients 206 and computer system 200 can be communicatively connected via one or more network connections 284, 285 such as wired or wireless network connections including connections via an intermediate network such as a wide area network or the internet 208. The computer system includes a web server 296 as a hardware, software, firmware, or combination component for providing one or more web applications 298 as are well known in the art. In use, the clients 206 communicate with the server 296 via the network to access and utilize the web application 298.

The web server 296 includes a configuration comprised of a plurality of features of the web server 296 including, for example, inter alia: a web server type such as a particular web server software component characterized by its vendor, model, version or the like; web technology support characteristics such as which version of one or more web or other protocols are supported by the web server 296; a configuration of the web server 296 in relation to one or more other components operating in, with or in communication with the computer system 200 such as middleware components, data storage components like databases, enterprise software components and other components as will be apparent to those skilled in the art; one or more configurations of how the web server 296 undertakes traffic management including how web server messages, content and the like are divided or split between network communications; the nature of the web server header format for HTTP message headers; the parameters of the web server to be included in web server response messages; the particular web pages for the web application 298 including templates, cascading style sheet (CSS) definitions, scripts, libraries and the like; server-side scripting such as PHP scripts and runtime; and other configuration and application characteristics for the web application 298.

Figure 3:
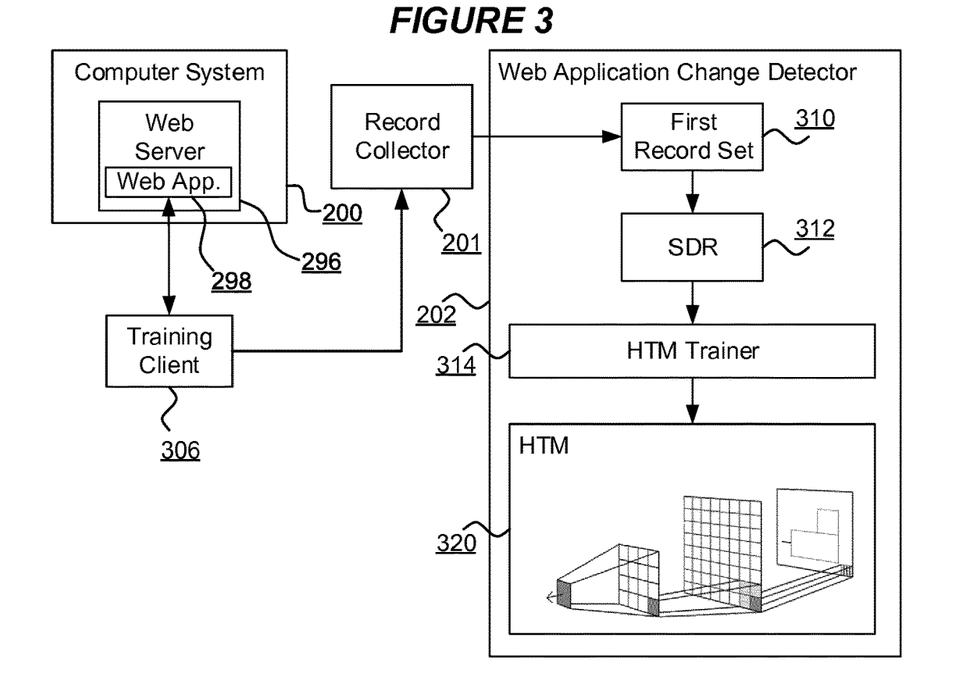
FIG. 3 is a component diagram illustrating the operation of a web application change detector component to train a hierarchical temporal memory in accordance with embodiments of the present disclosure.

FIG. 3 is a component diagram illustrating the operation of a web application change detector component 202 to train a hierarchical temporal memory (HTM) 320 in accordance with embodiments of the present disclosure. A training client 306 is provided which is a network connected software, hardware, firmware or combination component suitable for communication with the computer system 200 to operate as a client of the web application 298. For example, the client 306 includes a web browser suitable for accessing static, dynamic and/or rich internet web pages constituting a client portion and/or interface to or for the web application 298. Accordingly, the training client 306 operates as a client of the web application 298 in a training mode of operation in which the computer system, web server, web application and training client are absent any effect, tampering, infection or other encumbrance by malicious software, services or communications such as malware or attacks. For example, preferably the training client 306 and computer system 200 operate in a segregated, isolated, localized or otherwise protected environment such as a local network being disconnected from a wide area network or internet such that malicious encumbrances are avoided during the training mode of operation. The training mode of operation is a mode in which a model of typical characteristics of the web application 298, the web server 296, the computer system 200 and/or one or more web pages provided by the web server 296 for the application 298 are modelled for subsequent use in anomaly detection. Thus, the training client 306 operates to access and/or use the web application 298 by accessing static and/or dynamic web pages of the application 298 in a normal usage absent malicious encumbrances. In a preferred embodiment, such normal usage by the training client 306 is arranged to cover at least a minimum proportion of a range of features, facilities, web pages, services or other aspects of the web application 298 in order that characteristics for the web application 298 are broadly modelled.

Characteristics of the web application and/or web page(s) of the web application are collected during the training mode of operation. In one embodiment, the characteristics include at least part of a content of an HTTP header generated by the web server 296 for communications as part of the execution of the application 298. Additionally or alternatively, the characteristics can include an indication, definition, identification or other characteristics relating to how the web server 296 manages network traffic communicated to the training client 306 such as a profile of how network traffic is split, divided or distributed across network messages such as web server response messages sent to a browser at the training client 306. Additionally or alternatively the characteristics can include features of one or more HTTP response messages generated by the web server 296 in response to requests received from the training client 306. Such features of response messages can include particular parameters of response message fields as defined, for example, in HTTP response message format in section 6 of RFC2616 (Fielding, R. et al, The Internet Society, 1999, available at www.ietf.org/rfc/rfc2616.txt). Additionally or alternatively, the characteristics can include features of how the web server 296 closes a web connection such as, for example, by way of deferring to an underlying transport protocol such as a "FIN" message in TCP/IP, or by reliance on a web browser to close the connection. Yet further additionally or alternatively, the characteristics can include characteristics of a content of one or more web pages for the web application 298 such as hypertext markup language (HTML) tags in one or more webpages.

For example, a record collector component 201 as a hardware, software, firmware or combination component can be arranged to access, obtain, measure or otherwise determine the characteristics and collect the characteristics as a series of records constituting a first record set 310. In one embodiment, the record collector 201 is configured to receive HTTP messages from and/or via the training client 306 from which characteristics can be determined, derived, measured or inferred. In an alternative embodiment, the record collector 201 can additionally and/or alternatively receive information such as HTTP messages from the web server directly, such as by way of a proxy for the training client 306 or the web server 296. In further alternative embodiments the record collector 201 can be communicatively connected to the web server 296 such as via a network. In one embodiment the record collector 201 can be provided with and/or on either the training client 306 or the computer system 200 such as a software component of the training client 306 or computer system 200. In one embodiment, the record collector 201 is a multi-part component being at least partly provided as a software component installed on one or more of: the computer system 200; the training client 306; and/or another computer system or component.

The web application change detector 202 receives a first record set 310 from the record collector 201 in respect of operation of the training client 306 in the training mode of operation. The first record set 310 is a set of records for characteristics of the web application 298 in relation to operation of the web application 298 with the training client 306 for a defined period of time—known as a training time period.

The change detector 202 uses the records in the record set 310 to constitute training data inputs for training a hierarchical temporal machine (HTM) 320. The HTM 320 is a machine learning construct based on principles first described by Jeff Hawkins in "On Intelligence" (2004, Times Books, ISBN 0-8050-7456-2) and described in detail by Numenta in "Hierarchical Temporal Memory including HTM Cortical Learning Algorithms" (Numenta, 12 Sep. 2011). The principles of, implementation of and operation of HTM 320 are beyond the scope of this description and are nonetheless available to the skilled person through existing publications including the papers and books below, each and/or all of which are usable by a skilled person to implement the HTM 320 and other associated features for embodiments of the present invention:

"Biological and Machine Intelligence (BAMI)—A living book that documents Hierarchical Temporal Memory (HTM)" (Numenta, Inc., Mar. 8, 2017) (retrieved Mar. 29, 2017) available from numenta.com/assets/pdf/biological-and-machine-intelligence/BAMI-Complete.pdf "Porting HTM Models to the Heidelberg Neuromorphic Computing Platform" (Billaudelle, S. & Ahmad, S., May 2015) available from Cornell University Library (citation arXiv:1505.02142) and arxiv.org/abs/1505.02142

"Encoding Data for HTM Systems" (Purdy, S., February 2016) available from Cornell University Library (citation arXiv:1602.05925) and arxiv.org/abs/1602.05925

"Properties of Sparse Distributed Representations and their Application To Hierarchical Temporal Memory" (Ahmad, S. & Hawkins, J., March 2015) available from Cornell University Library (citation arXiv:1503.07469) and arxiv.org/abs/1503.07469

"How Do Neurons Operate on Sparse Distributed Representations? A Mathematical Theory of Sparsity, Neurons and Active Dendrites" (Ahmad, S. & Hawkins, J., January 2016) available from Cornell University Library (citation arXiv:1601.00720) and arxiv.org/abs/1601.00720

"Real-Time Anomaly Detection for Streaming Analytics" (Ahmad, S. & Purdy, S., July 2016) available from Cornell University Library (citation arXiv:1607.02480) and arxiv.org/abs/1607.02480

"Evaluating Real-time Anomaly Detection Algorithms—the Numenta Anomaly Benchmark" (Lavin, A. & Ahmad, S., October 2015) available from Cornell University Library (citation arXiv: 1510.03336) and arxiv.org/abs/1510.03336

"The HTM Spatial Pooler: A Neocortical Algorithm for Online Sparse Distributed Coding" (Cui, Y., Ahmad, S. & Hawkins, J., February 2017) available from Cold Spring Harbor Laboratory bioRxiv (citation doi.org/10.1101/085035) and biorxiv.org/content/biorxiv/early/2017/02/16/085035.full.pdf "Continuous Online Sequence Learning with an Unsupervised Neural Network Model" (Cui, Y., Ahmad, S. & Hawkins, K., November 2016) published in Published in Neural Computation (November 2016, Vol 28. No. 11) and available from numenta.com/papers/continuous-online-sequence-learning-with-an-unsupervised-neural-network-model/

"Why Neurons Have Thousands of Synapses, A Theory of Sequence Memory in Neocortex" (Hawkins, J. & Ahmad, S., March 2016) published in Frontiers in Neural Circuits (10 (2016) 1-13, doi:10.3389/fncir.2016.00023) and available from numenta.com/papers/why-neurons-have-thousands-of-synapses-theory-of-sequence-memory-in-neocortex/

At a very high level, in one embodiment, the HTM 320 is implementable logically as a hierarchy of functional nodes. The hierarchy of nodes in the HTM 320 are suitable for identifying coincidences in a temporal sequence of input patterns received at an input layer in the hierarchy, with interconnections between the layers permitting such identifications to take place also at each other level in the hierarchy. In addition to an identification of coincidences by nodes in the HTM 320, temporal relationships between coincidences can also be identified. Thus, in a purely exemplary arrangement, a first set of similar patterns occurring before a second set of similar patterns can be resolved to a coincidence (of the first set) with a temporal relationship to a coincidence (of the second set). The coincidences and temporal relations learned at each of many levels in the hierarchical HTM 320 provide for subsequent recognition, by the HTM 320, of a conforming temporal sequence of input patterns and non-conformant sequences. Thus, the HTM 320 can be said to operate in: a learning mode of operation in which coincidences and relationships between coincidences are learned by adaptation of the HTM 320 (and as described with reference to FIG. 3); and an inference mode of operation in which the HTM 320 is executed (by which it is meant that the HTM 320 is applied) to process one or more inputs to determine a degree of recognition of the inputs by the HTM 320 based on what has been learned by the HTM 320 (and as described with reference to FIG. 4). Recognition can be based on a determination, by nodes in the HTM 320, of a set of probabilities that an input belongs to one or more known or recognized coincidences in the trained HTM 320, and probabilities that inputs represent a recognized temporal group of coincidences.

When applied in embodiments of the present disclosure, the HTM 320 has two key features: firstly, the HTM 320 is trained based on the first record set 310 to represent a model of the characteristics of the web application 298 during the training mode of operation; and secondly the HTM 320 can determine whether subsequent record sets are recognizable to the HTM 320 and thus bear similarity to the operation of the web application 298 during training mode of operation. It is to be recalled that, during the training mode of operation, the web application 298 is not encumbered by malicious activity and, thus, a failure to recognize subsequent record sets by the HTM 314 in an inference mode of operation is indicative of web application characteristics that are anomalous.

While the HTM 320 has been described, by way of overview, structurally here, it will be appreciated that its implementation can be a logical representation or approximation of such a structure including a mathematical implementation employing, for example, linear algebra and/or parallel processing means for implementation.

The HTM 320 is trained by a HTM trainer 314 which is a hardware, software, firmware or combination component adapted to undertake the training of the HTM 320. It will be appreciated, on the basis of the above referenced papers and books, that the HTM 320 preferably operates on the basis of a sparse distributed representation (SDR) 312 of data. For example, an SDR can be a binary representation of data comprised of multiple bits in which only a small percentage of the bits are active (i.e. binary 1), and/or equivalent efficient representations of such schemes which may be compressed or the like (e.g. run-length encoded or the minority of bits that are active being somehow listed or otherwise identified). The bits in these representations have semantic meaning and meanings are distributed across the bits. SDR is described in "Sparse Distributed Representations" (Numenta, available from github.com/numenta/nupic/wiki/Sparse-Distributed-Representations and accessed on $29^{th}$ March 2017). Further, the principles underlying SDR are also described in "Sparse coding with an overcomplete basis set: A strategy employed by V1?" (Olshausen, B. A., Field, D. J., 1997, Vision Research, 37:3311-3325). Accordingly, the records in the first record set 310 are initially encoded to an SDR by a suitable encoder. Notably, the encoder is configured to set bits in a SDR 312 for a record based on a semantic meaning of the bits and thus the encoder is specifically configured to encode each record in to a SDR 312 based on semantic meaning of some aspect of the record including, for example, one or more of: a content of the record; characteristics of the record such as its length, origin, when it was received, how it was created, what created it etc.; what the record means, what it indicates, what consequence may ensue as a result of an occurrence recorded by the record etc.; and other aspects as will be apparent to those skilled in the art.

Thus, in use, the web application change detector 202 trains the HTM 320 using SDR representation 312 of records received in the first record set 310 for the web application 298 in use during a training mode of operation with a training client 306. The training time period, during which the web application 298 operates in the training mode of operation and the record collector 201 collects records of characteristics, can be determined based on a degree of recognition by the HTM 320 of new training records in the first record set 310. That is to say that the HTM Trainer 314 can additionally operate with the HTM 320 to determine a degree of recognition of each record in the first record set 310. In the early phases of training, a relatively greater proportion of records in the first record set 310 will cause a low degree of recognition by the HTM 320 since the HTM 320 will be relatively untrained. As training continues, the model of the HTM 320 will improve to reflect the characteristics of the web application 298 and the degree of recognition will increase. The training period can be flexible to expire based on a degree of recognition of the HTM 320 of records in the first record set 310 such that when such a degree of recognition meets a predetermined threshold, then training can be configured to cease or reduce. In one embodiment, the HTM 320 is adapted to provide an anomaly score for records in the first record set 310 reflective of a degree of recognition and it is the anomaly score meeting a predetermined threshold that determines when training should cease or reduce.

Accordingly, following training, the HTM 320 can be said to constitute a model or record of characteristics of the web application 298 during the training time period for which the first record set 310 was received. This model is subsequently used to detect an anomalous state of characteristics of the web application 298 as will be described with respect to FIG. 4.

Figure 4:
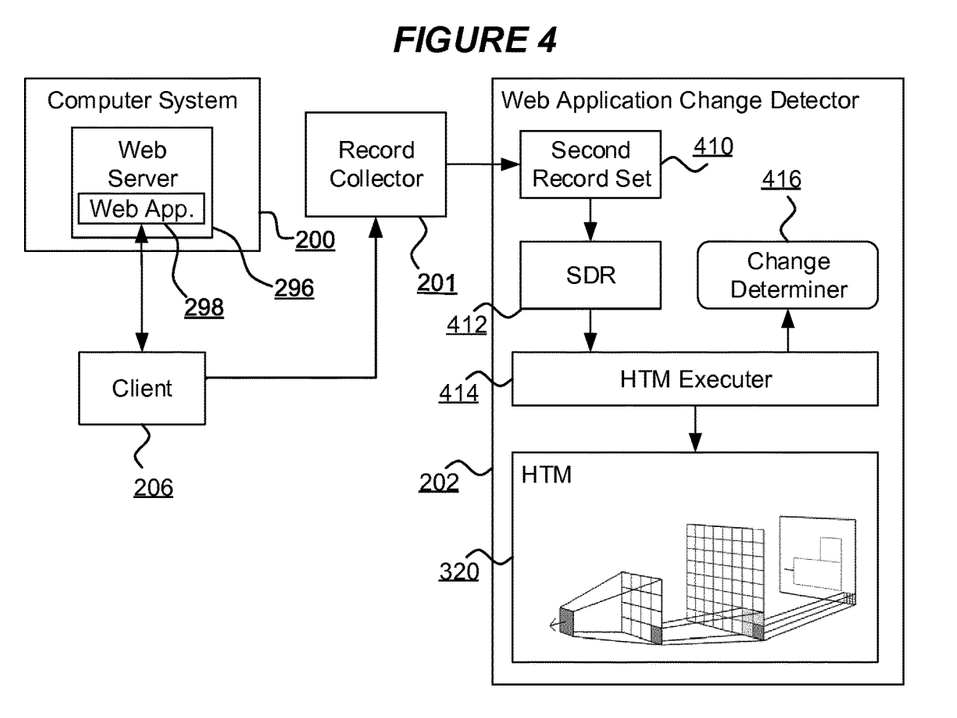
FIG. 4 is a component diagram illustrating the operation of the web application change detector component to detect a change for a web application in accordance with embodiments of the present disclosure.

FIG. 4 is a component diagram illustrating the operation of the web application change detector component 202 to detect a change for a web application 298 in accordance with embodiments of the present disclosure. The client 206 in FIG. 4 is operable to communicate with the web application 298 in a normal or production mode of operation in which there is no assurance, implication or presumption that the computer system 200, the web server 296, the web application 298 and/or the client 206 are operating without the influence, encumbrance or effect of malicious software and/or communication. The period during which the client operates in the normal or production mode of operation can be referred to as an operational time period and is defined as distinct to the training time period. During the operational time period, the record collector 201 generates a second set of records 410 of characteristics of the web application 298 substantially as hereinbefore described with reference to FIG. 3.

Thus, the web application change detector 202 receives a second record set 410 from the record collector 201 relating to the operational time period. Subsequently, an SDR 412 of the records of the second log is generated by an encoder substantially as previously described with respect to the first record set 310. An HTM executer 414 then executes the HTM 320 (now trained by way of the arrangement of FIG. 3) in an inference or recognition mode of operation. In this mode of operation, the HTM 320 determines a degree of recognition of each SDR data item input to it based on its learned model of the use of the web application 298 during the training time period. Based on this degree of recognition the HTM 320 also identifies anomalies as SDR inputs that are not recognized by the trained HTM 320.

The HTM 320, modelling the web application 298 during the training time period, will indicate a strong degree of recognition of SDR for records of the second record set 410 arising from operation of the web application 298 exhibiting characteristics consistent with those during the training period. If, however, anomalies are detected by the HTM 320 such that records from the second record set 410 are not recognized by the HTM 320, such anomalies indicate web application 298 characteristics deviating from those exhibited during the training time period. An anomaly can be identified by the HTM 320 based on a threshold degree of similarity of SDR 412 for records in the second record set 410. Thus, where anomalies are identified by the HTM 320 then a change to the configuration or web page(s) of the web application 298 are identified (depending on the characteristics used to generate the records in the first record set 310 of the training phase).

A change determiner 416 is a software, hardware, firmware or combination component responsive to the HTM executer 414 to determine that a substantive change to characteristics of the web application 298 has been detected. In one embodiment, a substantive change is identified when a degree of recognition (or an anomaly score) generated with reference to the HTM 320 exceeds a predetermined threshold. Depending on the nature of the web application characteristics modelled by the HTM 320, one or more responsive measures can be implemented when a characteristic change is identified. Responsive measures can include one or more of, for example, inter alia: interrupting operation of the web application 298 such as by terminating the application 298, pausing the application 298, preventing new connections to the application 298 or disconnecting existing connections; identifying client components in communication with the web application as potentially compromised by malicious software and/or communications or by disclosure of data; executing an intrusion detection, malware detection, virus removal and/or malware removal process for the web application 298; and effecting a redeployment, reinstallation and/or reconfiguration of the web application 298 which can include software constituting the web application 298 including the web server 296 and/or other software on the computer system 200.

Figure 5:
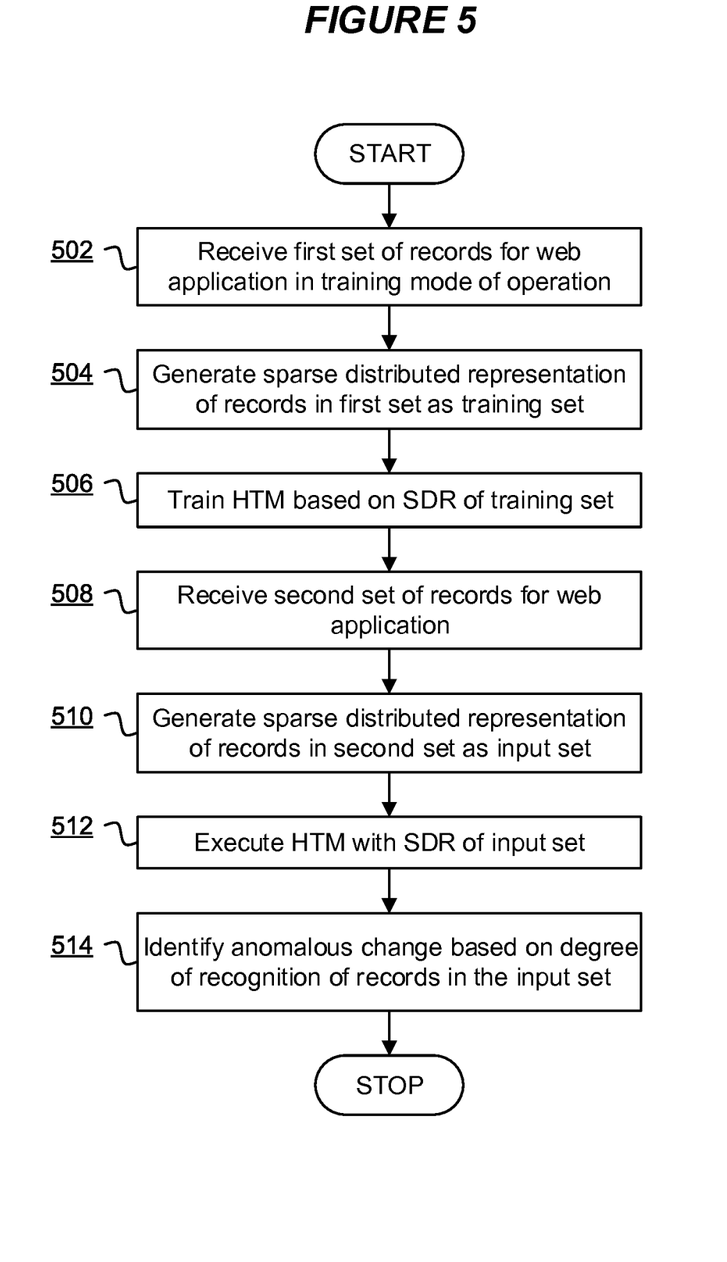
FIG. 5 is a flowchart of a method to detect an anomalous change to a web application executing with a web server in accordance with embodiments of the present disclosure.

FIG. 5 is a flowchart of a method to detect an anomalous change to a web application 298 executing with a web server 296 in accordance with embodiments of the present disclosure. At 502, the change detector 202 receives the first record set 310 as a first set of records for characteristics of the web application 298 operating in a training mode of operation. At 504 an SDR 312 is generated for each of the records in the first record set 410 to form a training set for the HTM 320. At 506 the HTM 320 is trained based on the training set such that the trained HTM 320 provides a model of the operation of the computer system during the training time period. At 508, the web application change detector 202 receives a second set of records for the computer system 200 as a second record set 410. Each record in the second record set 410 relates to characteristics of the web application 298 during an operational time period in use with a client 206. At 510, an SDR is generated for each of the records in the second record set 410 to form an input set for the trained HTM 320. At 512, the trained HTM 320 is executed based on the input set to determine a degree of recognition of the records of the input set by the HTM 320. At 514, the change detector 202 identifies anomalous characteristics of the web application 298 in the operational time period based on a degree of recognition by the HTM 320, where a degree of recognition below a predetermined threshold identifies an anomaly requiring responsive measures.

An exemplary embodiment of the present disclosure in which configuration characteristics of the web application 298 are used to identify potentially malicious configuration changes will now be described by way of example only. An evaluation of the behavior of a number of different web servers identifies that each web server can exhibit different characteristics based on its implementation, vendor, version, update, or configuration. For example, these differing characteristics can include:

HTTP Header Content: each web server can generate HTTP response messages with different header content.

Traffic Management: web servers may employ a different traffic management mechanism to manage how responses are communicated to web browsers. For example, such characteristics can determine how network communications are generated, a size of units of communication such as packets, the content of each unit of communication, etc.

HTTP Response Messages: different web servers may generate differently structure, formatted or substantively different response messages to web browser requests such as POST requests.

Closing the Web Connections: web servers can determine how a web connection should be closed, for example, whether by using an underlying protocol such as sending "FIN" in TCP/IP or relying on a web browser to close a connection.

How a HTM can be used to model a web application 298 based on configuration characteristics of a web server 296 employed for the application 298 will now be considered with reference to HTTP response messages by way of example only. The table below shows how different web servers can have different response messages.

| Server | Exemplary HTTP Response Message |
|---|---|
| Apache 2.2.4 with PHP enabled | HTTP/1.1 200 OK<br>Date: Thu, 4 Feb. 2016 09:11:47 GMT<br>Server: Apache/2.2.4 :Win32 DAV/2 mod_ssl/2.2.4 OpenSSL/0.9.8d mod_autoindex_color PHP/5.2.1<br>Last-Modified: Sat, 11 Nov. 2006 14:13:22 GMT<br>ETag: "7b2fa-1052-456a2480"<br>Accept-Ranges: bytes<br>Content-Length: 4178<br>Keep-Alive: timeout = 5, max = 99<br>Connection: Keep-Alive<br>Content-Type: text/css |
| Apache 2.4.18 with PHP enabled | HTTP/1.1 304 Not Modified<br>Date: Thu, 11 Feb. 2016 10:46:42 GMT<br>Server: Apache/2.4.18 (Win32) OpenSSL/1.0.2e PHP/7.0.2<br>Last-Modified: Tue, 6 Oct. 2015 10:03:37 GMT<br>ETag: "5675-52353982e9280"<br>Accept-Ranges: bytes<br>Content-Length: 3145<br>Connection: Keep-Alive<br>Keep-Alive: timeout = 5, max = 97<br>Content-Type: text/html |
| Tomcat 7.0 | HTTP/1.1 200 OK<br>Server: Apache-Coyote/1.1<br>Accept-Ranges: bytes<br>ETag: W/"9756-1305217116000"<br>Last-Modified: Thu, 12 May 2011 16:18:36 GMT<br>Content-Type: text/css<br>Content-Length: 9756<br>Date: Thu, 4 Feb. 2016 09:10:03 GMT |

Web application communication traffic from a web server contains characteristics for a web application. Each response message contains a list of attributes and their values. Characteristics include: the order of attributes; the number of attributes; and values of attributes. For example, in the above table, two HTTP response headers from two different web servers are given as examples. An HTM model of web application configuration characteristics can be learned for a web application and the model can be used to detect changes in such characteristics indicative of a configuration change for the web application.

In order to best employ the capability of an HTM it is preferably to adapt characteristic information in an SDR format:

1. Different web applications with potentially different configuration characteristics will have different HTTP response messages. First, response message fields are converted into an attribute sequence with field values as elements of the sequence. For example, the HTTP response from two different web applications executing with different web servers can be turned into the following sequences of characteristics:

Apache 2.2.4 Server: Date:value→Server:value→Last-Modified:value→ETag:value→Accept-Ranges: value→Content-Length:value→Keep-Alive:value→Connection:value→Content-Type:value Apache 2.4.18 Server: Date:value→Server:value→Last-Modified:value→ETag:value→Accept-Ranges: value→Content-Length:value→Connection: value→Keep-Alive:value→Content-Type:value Tomcat 7.0 Server: Server:value→Accept-Ranges:value→ETag:value→Last-Modified:value→Content-Type:value→Content-Length:value→Date:value From these examples we can see that, while the names of attributes are standardized, their order is quite different and depends on a type or configuration of a web server used by a web application.

2. These sequences of characteristics form a basis for training the HTM. In one embodiment, the sequences can be regularized using generalization rules. For example, instead of ETag: "7b2fa-1052-456a2480", a regularized expression can be formulated such as ETag: "^([a-z0-9]{5}-[a-z0-9]{4}-[a-z0-9]{8})$". Similarly, instead of Date: Thu, 4 Feb. 2016 09:10:03 GMT, a regularized expression can be formulated such as Date: "EEE, dd MMM yyyy HH:mm:ss z".

Using such an approach the sequences above can be converted to:

Apache 2.2.4 Server: Date: "EEE, dd MMM yyyy HH:mm:ss z" →Server: "Apache/2.2.4:Win32 DAV/2 mod_ssl/2.2.4 OpenSSL/0.9.8d mod_autoindex_color PHP/5.2.1" →Last-Modified: "Sat, 11 Nov. 2006 14:13:22 GMT" →ETag: "^([a-z0-9]+-[a-z0-9]+-[a-z0-9]+)$" →Accept-Ranges: "bytes" →Content-Length: "\\d+" →Keep-Alive: "timeout=(\\d+), max=(\\d+)" →Connection: "Keep-Alive" →Content-Type: "^([a-z]/[a-z])$"

Apache 2.4.18 Server: Date: "EEE, dd MMM yyyy HH:mm:ss z" →Server: "Apache/2.4.18 (Win32) OpenSSL/1.0.2e PHP/7.0.2" →Last-Modified: "Tue, 6 Oct. 2015 10:03:37 GMT" →ETag: "^([a-z0-9]+-[a-z0-9]+)$" →Accept-Ranges: "bytes" →Content-Length: "\\d+" →Keep-Alive: "timeout=(\\d+), max=(\\d+)" →Connection: "Keep-Alive" →Content-Type: "^([a-z]/[a-z])$"

Tomcat 7.0 Server: Server: "Apache-Coyote/1.1" →Accept-Ranges: "bytes" →ETag: "^(W/\"[0-9]+-[0-9]+\")$" →Last-Modified: "Thu, 12 May 2011 16:18:36 GMT" →Content-Type: "^([a-z]/[a-z])$" →Content-Length: "\\d+" →Date: "EEE, dd MMM yyyy HH:mm:ss z"

3. For training an HTM, each element of a signature sequence needs to be encoded into SDR. An existing SDR category encoder from an HTM implementation can be used here. For example, a 100 bits SDR can be used with 10% of bits activated to encode each element of a sequence, with bits having semantic significance in the context of the characteristics in a signature sequence. The three examples in the previous step can be encoded as shown in the following tables:

| 4. Apache 2.2.4 Server | |
|---|---|
| Element of sequence | Encoded SDR |
| Date: "EEE, dd MMM yyyy HH:mm:ss z" | 0000000000000000010000 0000000000001000000000 0000000000000000001100 0001000100100000000000 0100100010000 |
| Server: "Apache/2.2.4 :Win32 DAV/2 mod_ssl/2.2.4 OpenSSL/0.9.8d mod_autoindex_color PHP/5.2.1" | 0010010000100000000000 0000000000100001000000 0000000001000001000000 0000000010000000000000 000000000011 |
| Last-Modified: "Sat, 11 Nov. 2006 14:13:22 GMT" | 1000001000000001000010 0000000000001000000000 0000000000110000000100 0000000001000000000000 0100000000000 |
| ETag: "^([a-z0-9]{5}-[a-z0-9]{4}-[a-z0-9]{8})$" | 1000000000000000000010 0000000000010001000000 0000000010000100100000 0000000000010000000000 1000100000000 |
| Accept-Ranges: "bytes" | 1000100000000000000000 0000000100000010000000 0100000100010010000000 0000000000100000001000 000000000000 |
| Content-Length: "\\d+" | 0000000001000001010000 0000001000000000000000 0000000000000001000001 0000000000000000010010 00000001010 |
| Keep-Alive: "timeout = (\\d+), max = (\\d+)" | 0100000000000001000000 1000000001000000000000 0000000000000010001000 0000000000000000000001 1000100000100 |
| Connection: "Keep-Alive" | 0000000101000000010000 0000100000000000000100 0000000000000001000000 0001000000001000000100 0000000100000 |
| Content-Type: "^([a-z]/[a-z])$" | 0100000000000000000010 0010000000100010000000 0000001001000000000000 0000000011000000000000 000000100000 |

| Apache 2.4.18 Server | |
|---|---|
| Element of sequence | Encoded SDR |
| Date "EEE, dd , MMM yyyy HH:mm:ss z" | 0000000000000000010000 0000000000001000000000 0000000000000000001100 0001000100100000000000 0100100010000 |
| Server: "Apache/2.4.18 Win32 OpenSSL/1.0.2e PHP/7.0.2" | 0001000100000000000000 0010000000100000000001 0001000100000000000000 0100000000000010000000 000000100000 |
| Last-Modified: "Tue, 6 Oct. 2015 10:03:37 GMT" | 0000001000000000000000 0000000000000000000000 0010010000011000000010 0000000001000000010000 100100000000 |
| ETag: "^([a-z0-9] + -[a-z0-9]+)$" | 0001000100000000000000 0000000000000000000000 0100001000001000000000 1001000001100000000000 0010000000000 |
| Accept-Ranges: "bytes" | 1000100000000000000000 0000000100000010000000 0100000100010010000000 0000000000100000001000 000000000000 |
| Content-Length: "\\d+" | 0000000001000001010000 0000001000000000000000 0000000000000001000001 0000000000000000010010 00000001010 |
| Connection: "Keep-Alive" | 0000000101000000010000 0000100000000000000100 0000000000000001000000 0001000000001000000100 0000000100000 |
| Keep-Alive: "timeout = (\\d+), max = (\\d+)." | 0100000000000001000000 1000000001000000000000 0000000000000010001000 0000000000000000000001 1000100000100 |
| Content-type: "^([a-z]/[a-z])$" | 0100000000000000000010 0010000000100010000000 0000001001000000000000 0000000011000000000000 000000100000 |

| Tomcat 7.0 Server | |
|---|---|
| Element of sequence | Encoded SDR |
| Server: "Apache-Coyote/1.1" | 0 0 0 0 0 1 0 0 0 0 0 0 0 0 0 1 0 0 1 0 1<br>0 0 0 0 0 0 1 0 0 0 0 0 1 0 0 0 0 0 0 0 0 0<br>0 0 0 0 0 0 1 0 0 0 0 0 0 0 0 0 0 0 0 0 0 0<br>0 0 0 0 0 1 0 0 0 0 0 0 0 0 0 0 0 0 0 0 0 0<br>0 0 0 0 0 0 0 0 1 0 0 1 |
| Aecept-Ranges: "bytes" | 1 0 0 0 1 0 0 0 0 0 0 0 0 0 0 0 0 0 0 0 0 0<br>0 0 0 0 0 0 0 1 0 0 0 0 0 0 1 0 0 0 0 0 0 0<br>0 1 0 0 0 0 0 1 0 0 0 1 0 0 1 0 0 0 0 0 0 0<br>0 0 0 0 0 0 0 0 0 0 1 0 0 0 0 0 0 0 1 0 0 0<br>0 0 0 0 0 0 0 0 0 0 |
| ETag: "'(W/\"[0-9] + -[0-9]+\")$" | 0 0 0 0 0 0 0 0 0 0 1 0 0 0 0 1 0 0 0 0 0<br>0 0 0 0 0 1 0 0 0 0 0 0 0 1 0 0 0 0 0 0 0 0<br>0 0 0 0 0 0 0 0 0 0 0 0 1 0 0 0 0 0 1 0 1 0<br>0 0 0 0 0 0 0 0 0 0 0 0 0 0 0 0 0 0 0 0 0 0<br>1 0 0 1 0 0 0 1 0 0 0 0 |
| Last-Modified: "Thu, 12 May 2011 16:18:36 GMT" | 0 1 0 0 0 0 0 0 0 0 0 0 0 0 0 0 0 0 0 0 0 0<br>0 1 0 0 0 0 0 0 0 0 0 0 0 0 0 0 0 0 0 0 1 0<br>0 0 0 0 0 0 0 0 0 0 0 0 0 0 0 0 0 0 1 0 0<br>0 0 0 0 0 0 0 0 0 0 0 0 0 1 0 0 0 0 0 0 0 0<br>0 0 1 0 1 0 1 1 0 1 0 0 |
| Content-Type: "'([a-z]/[a-z])$" | 0 1 0 0 0 0 0 0 0 0 0 0 0 0 0 0 0 0 0 0 1 0<br>0 0 0 1 0 0 0 0 0 1 0 0 0 1 0 0 0 0 0 0 0 0<br>0 0 0 0 0 0 1 0 0 1 0 0 0 0 0 0 0 0 0 0 0 0<br>0 0 0 0 0 0 0 0 1 1 0 0 0 0 0 0 0 0 0 0 0 0<br>0 0 0 0 0 0 1 0 0 0 0 0 |
| Content-Length: "\\d+" | 0 0 0 0 0 0 0 0 1 0 0 0 0 0 1 0 1 0 0 0 0 0<br>0 0 0 0 0 0 1 0 0 0 0 0 0 0 0 0 0 0 0 0 0 0<br>0 0 0 0 0 0 0 0 0 0 0 0 0 0 1 0 0 0 0 0 1<br>0 0 0 0 0 0 0 0 0 0 0 0 0 0 0 0 1 0 0 1 0<br>0 0 0 0 0 0 0 1 0 1 0 |
| Date: "EEE, dd MMM yyyy HH:mm:ss z" | 0 0 0 0 0 0 0 0 0 0 0 0 0 0 0 0 0 1 0 0 0 0<br>0 0 0 0 0 0 0 0 0 0 0 1 0 0 0 0 0 0 0 0 0<br>0 0 0 0 0 0 0 0 0 0 0 0 0 0 0 0 0 0 1 1 0 0<br>0 0 0 1 0 0 0 1 0 0 1 0 0 0 0 0 0 0 0 0 0<br>0 1 0 0 1 0 0 0 1 0 0 0 |

The SDR representation can be used to train an HTM to develop a model of web application configuration characteristics. It is necessary to continuously train the HTM with SDR encoded records of configuration characteristics in a correct order so that the HTM can develop the appropriate model which has a temporal dimension. Every time an element of a sequence is input to the HTM during training, the HTM can provide an anomaly score (e.g. normalized between 0 and 1) for the input. At the beginning of the training, as the HTM has not learned characteristics yet, inputs will generate anomaly scores indicating a lack of recognition by the HTM. However, as the HTM learns sufficient the features of the input sequences (e.g. 1000-3000 training examples), the anomaly score can stabilize to a relatively lower level.

Monitoring configuration characteristics for a web application is effective for identifying changes to a web application configuration such as changes to an underlying web browser or its configuration. Furthermore, additionally or alternatively training the HTM based on web page characteristics can serve to identify web page changes arising from malicious encumbrances such as malicious software or network communication.

For example, malware can infect a web server in order to communicate commands to other infected network connected systems. Such commands can be embedded in HTML web pages such as inside additional HTML tags for receipt and reading by a receiving infected system. Additionally or alternatively, malware infecting a web server can cause the distribution of malicious code to other network connected systems to infect them or to update an incumbent infection. For example, such code can be included in additional HTML tags and/or embedded scripts such as JavaScript. Furthermore, an attacker can attack a web server using cross site scripting—XSS—such as a reflective XSS whereby the attacker injects malicious script that can be reflected to each client requesting an HTML web page in order to infect the client or redirect the client as part of a phishing activity intended to access sensitive information of the client or its user.

Thus, once malware infects a web server, then the malware may use the web server as a vehicle to spread infection via responses to client web requests, such as by sending the malware or a link to the malware, or malware infection code, to a client web browser. Additionally or alternatively, malware may send commands to infected systems such as bots in a botnet listening on an infected system.

Where malware communicates binary code in a requested web page, the web page may include additional <script>, <onload> or similar HTML tags that provide for the execution of scripts followed by a binary representation of malware code, such as code to infect a receiving system once executed. Some malware can be distributed stealthily by splitting the actual code into smaller parts and spreading these parts across multiple sections of a HTML document or, indeed, multiple documents. This is an effort to evade detection since malicious code in a single place within an HTML file may trigger conventional intrusion detection or virus detection rules. However, where the code is split within an HTML file then such rules may be evaded and the code may pass without detection. Thus the use of additional tags is commonplace in the distribution of such code.

Similarly, an attacker may seek to compromise a web server to access sensitive information or to inject malicious JavaScript that will run on client web browsers to reveal confidential information from the customer, steal access cookies to web servers, or redirect the user to phishing web site to steal credentials (for example, redirect a user to a fake bank login web site to steal his credentials). An example the XSS attack or defacing attack where an attacker will inject malicious JavaScript into one or more web pages of a vulnerable web application in order to redirect a user to another malicious web server or run the JavaScript into the user's browser to steal their confidential cookies to access other web servers. Such an approach also involves the use of additional tags in HTML web pages.

A learned HTM model based on characteristics of a web application corresponding to characteristics of a content of one or more web pages can be used to detect such malicious changes to web pages for the web application.

Below is an exemplary HTML web page, hello.html, for an exemplary web application running on a web server:

```
<HTML>
<BODY>
<P><B>Hello World!</B></P>
</BODY>
</HTML>
```

A possible result of an attack directed at the web server hosting hello.html is the injection of a piece of JavaScript code to display an extra link to a phishing page as illustrated in the revised version of hello.html below:

```
<HTML>
<BODY>
<P><B>Hello World!</B></P>
</BODY>
</HTML>
<SCRIPT>
var a = document.createElement('a');
var linkText = document.createTextNode("Click here to continue");
a.appendChild(linkText);
a.href = "http://phishing.com";
document.body.appendChild(a);
</SCRIPT>
```

A user new to the content of the page will possibly click the link and navigate to the phishing page. In another example arrangement, the link could be set to invisible in the web browser such that it is provided to command infected software already resident on a client browser machine, such as a bot in a botnet. Such an invisible tag will not appear to a user.

Another example of an attack based on hello.html involves by injecting code into an existing tag is shown below, causing a redirect of the web page to a phishing site once it is loaded:

```
<HTML>
<BODY onload="window.location='http://phishing.com'">
<P><B>Hello World!</B></P>
</BODY>
</HTML>
```

In the following example, we show the result of using an HTM to detect changes to characteristics of a web page to identify modification of a web page. Specifically, in the example embodiment below, the HTM is trained to model characteristics of a web page structure as opposed to the detailed web page content. This is advantageous because the structure of the webpage is much less likely to change whereas the content of the page will change frequently, especially in dynamically generated web pages. The web page is initially transformed into a web page structure format for use as input in training the HTM:
  1. The structure of a web page is converted to HTML tag sequence. This is suitable because HTML tags describe a structure of a page and do not often change, even for dynamically generated pages in a web application. For example, the hello.html page can be transformed into the following sequence:
     "<HTML>"→"<BODY>"→"<P>"→"<B>"→
     "</B>"→"</P>"→"</BODY>"→"</HTML>"
The HTM is trained from the web page structure reflected by such sequences. Since a web page presented to a user is based on combinations of tags and a hierarchy of tags, including nesting and relationships between tags, the HTM builds a full mapping of the tags with the relationship between them.
  2. Subsequently, the HTML tag sequences and the relationship between tags are encoded into SDR for training an HTM. For example, encoding can be based on:
     a. Tag identification: e.g. <script>, <b>, <p> etc.
     b. A sequence of tags: the sequence of the Tags in the HTML page.
     c. Relationships between tags: following the logic of how tags are presented in the web page, for example: normally <B> then <P> then </P> then end with </B>.

An exemplary SDR representation for the hello.html tag sequence is provided below:

| hello.html | |
| --- | --- |
| Element of sequence | Encoded SDR |
| <HTML> | 0 0 0 0 0 0 1 0 1 0 0 0 0 0 0 0 0 0 0 0 0 0 0 0 0 0 0 0 0 1 0 0 0 0 0 1 0 0 0 0 1 0 1 0 0 0 0 0 0 0 0 0 0 0 0 0 0 0 0 0 0 0 0 0 0 0 0 0 1 0 0 0 0 0 0 1 0 0 0 0 0 0 0 0 0 0 0 0 0 0 0 0 0 0 1 1 0 0 0 |
| <BODY> | 0 0 1 0 0 0 0 0 0 1 0 0 0 0 0 0 0 0 0 0 0 0 0 0 0 0 0 1 0 0 0 0 1 0 0 0 0 1 0 0 0 0 0 0 0 0 0 0 0 0 0 0 0 0 0 0 0 0 0 1 0 0 0 0 0 0 0 0 0 0 0 0 0 0 0 0 0 0 0 0 0 0 0 0 0 0 0 0 0 1 0 0 0 1 0 0 0 0 0 0 1 1 |
| <P> | 0 0 0 0 0 1 0 1 0 1 0 0 0 0 0 1 0 0 0 0 0 0 0 0 0 0 0 0 0 0 0 1 0 0 0 0 0 1 0 0 0 0 0 0 0 0 0 0 0 0 0 0 0 0 0 0 0 0 0 0 0 1 0 0 0 0 0 0 0 0 0 0 0 0 0 0 0 1 0 1 0 0 0 0 0 0 0 0 0 0 0 1 0 0 0 |
| <B> | 0 0 1 0 0 0 0 0 0 0 0 0 0 0 0 0 0 0 0 1 1 0 0 0 0 0 0 0 0 0 0 0 0 1 0 0 0 1 0 0 0 0 0 0 0 0 1 0 0 0 0 0 0 0 0 0 0 0 0 0 0 0 0 0 0 0 1 0 0 0 0 0 0 0 0 0 0 0 1 0 0 0 0 0 0 0 0 0 0 0 1 0 0 1 0 0 0 0 0 |
| </B> | 1 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 1 0 0 0 0 0 0 0 0 1 0 0 0 0 1 1 0 0 1 0 1 0 0 0 0 0 0 0 0 0 1 0 0 0 0 0 1 0 0 0 0 0 0 0 0 1 0 |
| </P> | 0 0 0 0 0 0 0 0 0 0 0 0 0 0 0 0 0 0 0 0 1 0 0 0 0 0 0 0 0 0 1 0 0 0 0 0 0 0 0 1 0 0 0 0 0 1 0 0 0 1 0 0 0 0 0 0 0 1 0 0 0 0 0 0 0 1 0 1 0 0 0 0 0 0 1 1 0 0 0 0 0 0 0 0 0 0 0 0 0 0 0 0 0 0 0 0 |
| </BODY> | 0 0 0 0 0 0 0 0 1 0 0 0 0 0 0 0 0 0 0 1 0 0 0 0 1 0 0 0 0 0 0 0 0 0 0 0 0 0 0 1 0 1 0 0 0 0 0 0 1 0 0 0 0 0 0 0 0 0 0 0 0 0 0 0 0 0 1 0 0 0 0 0 0 0 0 0 1 0 0 0 0 0 0 1 0 0 0 0 0 0 0 0 0 1 0 0 |
| </HTML> | 0 0 0 0 0 0 0 0 0 1 0 1 0 0 0 0 0 0 0 0 0 0 0 0 0 0 0 0 0 0 0 0 0 0 0 0 0 1 0 0 0 0 0 0 0 0 1 1 0 0 0 0 0 0 0 0 0 1 0 0 0 1 0 0 0 0 0 0 0 0 0 0 0 0 0 0 0 0 0 1 0 0 0 0 0 0 0 1 0 0 0 0 0 0 0 0 0 0 1 0 |

Such an SDR representation is used to train the HTM to generate an HTM model of characteristics of web page(s) for a web application and, subsequently, in an inference mode of operation of the HTM model to identify anomalies indicating changes to such characteristics.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to detect an anomalous change to a configuration of a web application, the web application executing with a web server, the method comprising:
   receiving a first set of distinct records for the web application operating in a training mode of operation during which the web application is isolated from a wide area network, each record in the first set of distinct records including characteristics of a content of a web page the web application during a training time period;
   generating a sparse distributed representation of the first set of distinct records to form a training set for a hierarchical temporal memory (HTM);
   training the HTM based on the training set in order that the trained HTM provides a model of operation of the web application in the training mode of operation, wherein the HTM evaluates an anomaly score for the records in the first set of distinct records and the HTM is trained until the anomaly score meets a predetermined threshold degree of anomaly;
   receiving a second set of distinct records for the web application, each record in the second set of distinct records including characteristics of the web application during an operational time period, the operational time period being distinct from the training time period;
   generating a sparse distributed representation of the second set of distinct records to form an input set for the trained HTM;
   executing the trained HTM based on the input set to determine a degree of recognition of the records of the input set;
   responsive to a determination that a degree of recognition of one or more records of the input set is below a threshold degree, identifying an anomalous change to the configuration of the web page; and
   in response to the identification of the anomalous change to the web page, causing a responsive measure to the anomalous change to be implemented that includes one or more of the following actions:
   interrupting operation of the web application;
   identifying client components in communication with the web application as potentially compromised;
   executing at least one of an intrusion detection, malware detection, virus removal, or a malware removal process for the web application; or
   effecting at least one of a redeployment, a reinstallation, or a reconfiguration of the web application.

2. The method of claim 1, wherein the characteristics of the web page include records corresponding to hypertext markup language (HTML) tags in the web page.

3. A computer system comprising:
   a processor and memory storing computer program code for detecting an anomalous change to a configuration of a web application, the web application executing with a web server, by:
   receiving a first set of distinct records for the web application operating in a training mode of operation during which the web application is isolated from a wide area network, each record in the first set of distinct records including characteristics of a content of a web page for the web application during a training time period;
   generating a sparse distributed representation of the first set of distinct records to form a training set for a hierarchical temporal memory (HTM);
   training the HTM based on the training set in order that the trained HTM provides a model of operation of the web application in the training mode of operation, wherein the HTM evaluates an anomaly score for the records in the first set of distinct records and the HTM is trained until the anomaly score meets a predetermined threshold degree of anomaly;
   receiving a second set of records for the web application operating in a production mode of operation, each record in the second set of records including characteristics of content of the web page during an operational time period, the operational time period being distinct from the training time period and the production mode of operation being distinct from the training mode of operation;
   generating a sparse distributed representation of the second set of distinct records to form an input set for the trained HTM;
   executing the trained HTM based on the input set to determine a degree of recognition of the records of the input set;
   responsive to a determination that a degree of recognition of one or more records of the input set is below a threshold degree, identifying an anomalous change to the web page; and
   responsive to the identification of the anomalous change to the web page, causing a responsive measure to the anomalous change to be implemented that includes one or more of the following actions:
   interrupting operation of the web application;
   identifying client components in communication with the web application as potentially compromised;
   executing at least one of an intrusion detection, malware detection, virus removal, or a malware removal process for the web application; or
   effecting at least one of a redeployment, a reinstallation, or a reconfiguration of the web application.

4. A non-transitory computer-readable storage element comprising computer program code to, when loaded into a computer system and executed thereon, cause the computer system to perform the method as claimed in claim 1.

* * * * *